United States Patent
Vaas et al.

(10) Patent No.: US 10,279,649 B2
(45) Date of Patent: May 7, 2019

(54) HEAT AND DUST SHIELD

(71) Applicants: CARRIER CORPORATION, Farmington, CT (US); Philippe Vaas, Franqueville Saint Pierre (FR)

(72) Inventors: Philippe Thierry Vaas, Mesnil Raoul (FR); Aurelie Liebmann, Rouen (FR)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/560,095

(22) PCT Filed: Mar. 20, 2015

(86) PCT No.: PCT/IB2015/000530
§ 371 (c)(1),
(2) Date: Sep. 20, 2017

(87) PCT Pub. No.: WO2016/151351
PCT Pub. Date: Sep. 29, 2016

(65) Prior Publication Data
US 2018/0086176 A1    Mar. 29, 2018

(51) Int. Cl.
*B60H 1/00* (2006.01)
*B60P 3/20* (2006.01)
*B60H 1/32* (2006.01)

(52) U.S. Cl.
CPC ..... *B60H 1/00364* (2013.01); *B60H 1/00014* (2013.01); *B60P 3/20* (2013.01); *B60H 2001/3286* (2013.01)

(58) Field of Classification Search
CPC ........................... B62D 25/161; B62D 25/168
(Continued)

(56) References Cited

U.S. PATENT DOCUMENTS 3,632,137 A * 1/1972 Jossy .................. B62D 25/188
                                                    280/851
3,697,120 A * 10/1972 Saunders ............. B62D 35/001
                                                    105/1.1
(Continued)

FOREIGN PATENT DOCUMENTS

CA    2080386 A1    4/1994
EP    2108544 A1    10/2009
(Continued)

OTHER PUBLICATIONS

European Search Report for application EP 16161279.1, dated Nov. 9, 2016, 7 pages.
(Continued)

*Primary Examiner* — Jeffrey J Restifo
(74) *Attorney, Agent, or Firm* — Cantor Colburn LLP

(57) ABSTRACT

A transportation refrigeration system is provided including a tractor cabin having an engine and an engine cooling system. A trailer is operably coupled to the tractor cabin. A transport refrigeration unit is configured to maintain a controller temperature environment of a portion of the trailer. The transport refrigeration unit is mounted to a front surface of the trailer adjacent the truck. A shield (50) is mounted to at least one of the tractor cabin, trailer, and transport refrigeration unit. The shield is configured to block an air flow path between an area (42) of discharge air from the engine cooling system and a condenser air inlet (32) of the transport refrigeration unit.

9 Claims, 3 Drawing Sheets

(58) Field of Classification Search
USPC ........ 280/152.3, 847, 851; 296/180.4, 180.5, 296/187.07
See application file for complete search history.

(56) References Cited

U.S. PATENT DOCUMENTS

| | | | | |
|---|---|---|---|---|
| 3,797,879 | A * | 3/1974 | Edwards | B62D 35/001 105/1.1 |
| 3,878,914 | A | 4/1975 | Gulich et al. | |
| 3,899,192 | A * | 8/1975 | Reddaway | B62D 25/188 280/851 |
| 3,929,202 | A | 12/1975 | Hobbensiefken | |
| 3,934,923 | A | 1/1976 | Lissaman et al. | |
| 4,103,957 | A * | 8/1978 | Landry | B62D 35/001 105/1.2 |
| 4,143,731 | A | 3/1979 | Haustein | |
| 4,210,354 | A * | 7/1980 | Canning | B62D 35/001 105/1.2 |
| 4,334,694 | A * | 6/1982 | Iwanicki | B62D 25/18 280/848 |
| 4,372,570 | A * | 2/1983 | Goodall | B62D 25/18 280/851 |
| 4,585,262 | A * | 4/1986 | Parks | B62D 35/005 296/180.1 |
| 4,595,207 | A | 6/1986 | Popp | |
| 4,781,388 | A | 11/1988 | Woehrl et al. | |
| 4,957,325 | A * | 9/1990 | Engel | B62D 35/001 296/180.2 |
| 5,076,590 | A * | 12/1991 | Steinetz | F02K 1/805 239/127.1 |
| 5,269,547 | A * | 12/1993 | Antekeier | B62D 25/188 248/231.61 |
| 5,318,309 | A | 6/1994 | Tseng | |
| 5,332,280 | A | 7/1994 | Dupont et al. | |
| 5,752,805 | A | 5/1998 | Gail et al. | |
| 6,347,809 | B1 * | 2/2002 | Mack | B62D 25/188 280/154 |
| 6,394,475 | B1 * | 5/2002 | Simon | B62D 25/188 248/221.11 |
| 6,585,312 | B2 | 7/2003 | Jain | |
| 6,805,356 | B2 | 10/2004 | Inoue | |
| 6,923,783 | B2 | 8/2005 | Pasqualucci | |
| 6,955,369 | B1 * | 10/2005 | Schiebout | B60D 1/58 280/154 |
| 7,073,845 | B2 * | 7/2006 | Ortega | B62D 35/001 296/180.2 |
| 7,216,923 | B2 | 5/2007 | Farmer et al. | |
| 7,789,412 | B2 | 9/2010 | Algueera | |
| 7,950,720 | B2 | 5/2011 | Skopic | |
| 8,807,628 | B1 * | 8/2014 | Pfaff | B62D 35/001 296/180.1 |
| 8,857,893 | B2 | 10/2014 | Reiman et al. | |
| 8,911,206 | B2 * | 12/2014 | Campbell | F03D 11/00 415/204 |
| 8,960,769 | B2 | 2/2015 | He | |
| 9,796,432 | B2 * | 10/2017 | Stauter | B62D 35/001 |
| 2006/0055118 | A1 | 3/2006 | Beichl | |
| 2007/0132190 | A1 | 6/2007 | Trabert | |
| 2008/0217957 | A1 | 9/2008 | Schoon et al. | |
| 2008/0309017 | A1 * | 12/2008 | Mattice | A46B 5/06 277/355 |
| 2009/0025994 | A1 * | 1/2009 | Kakishita | B60K 11/08 180/68.6 |
| 2010/0218531 | A1 | 9/2010 | Khan | |
| 2010/0242462 | A1 | 9/2010 | Smith | |
| 2013/0088039 | A1 * | 4/2013 | Feight | B62D 35/001 296/180.2 |
| 2014/0232133 | A1 * | 8/2014 | He | B62D 35/001 296/180.2 |
| 2016/0272256 | A1 * | 9/2016 | Stauter | B62D 35/001 |

FOREIGN PATENT DOCUMENTS

| | | |
|---|---|---|
| GB | 439367 A | 12/1935 |
| WO | 2014047615 A1 | 3/2014 |
| WO | 2014106264 A1 | 7/2014 |

OTHER PUBLICATIONS

International Search Report for application PCT/IB2015/000530 dated Nov. 26, 2015, 6 pages.
Written Opinion for application PCT/IB2015/000530 dated Nov. 26, 2015, 4 pages.

* cited by examiner

HEAT AND DUST SHIELD

CROSS REFERENCE TO RELATED APPLICATION

This application is a National Stage application of PCT/IB2015/000530, filed Mar. 20, 2015, which is incorporated by reference in its entirety herein.

BACKGROUND

This invention relates generally to transport refrigeration systems, and more particularly, to a shield arranged between a tractor and a trailer of a transport refrigeration system.

Refrigerated trucks, trailers, and intermodal containers, collectively mobile refrigeration systems, are commonly used to transport perishable cargo, such as, for example, meat, poultry, dairy products, cut flowers, and other fresh or frozen products, by road, rail, sea, or intermodally. In the case of refrigerated trucks, a transport refrigeration system is mounted to the truck, typically behind the tractor cabin or on the roof of the tractor cabin for maintaining a controlled temperature environment within the cargo box of the truck. In the case of refrigerated trailers, which are typically pulled behind a tractor cabin, a transport refrigeration system is mounted to the trailer, typically to the front wall of the trailer for maintaining a controller temperature environment within the cargo box of the trailer.

Conventionally, transport refrigeration systems used in connection with refrigerated trucks and refrigerated trailers include a transport refrigeration unit having a refrigerant compressor, a condenser with one or more associated condenser fans, an expansion device, and an evaporator, with one or more associated evaporator fans, which are connected via appropriate refrigerant lines in a closed refrigerant flow circuit. Air is drawn from the interior volume of the cargo box by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

During movement of the transport refrigeration system, particularly tractor-trailer systems, air from the tractor cabin engine cooling system is expelled adjacent, such as below, the condenser air inlet of the transport refrigeration unit. The condenser draws in a mixture of ambient air and air from the tractor cabin engine cooling system and uses that to cool the refrigerant flowing there through. The increased temperature of the condenser air intake reduces the efficiency of the condenser and therefore the transport refrigeration unit. In addition, dust and dirt is also drawn through the condenser air intake causing deterioration of the efficiency and reliability of the transport refrigeration unit.

SUMMARY OF THE INVENTION

According to an embodiment of the invention, a transportation refrigeration system is provided including a tractor cabin having an engine and an engine cooling system. A trailer is operably coupled to the tractor cabin. A transport refrigeration unit is configured to maintain a controller temperature environment of a portion of the trailer. The transport refrigeration unit is mounted to a front surface of the trailer adjacent the truck. A shield is mounted to at least one of the tractor cabin, trailer, and transport refrigeration unit. The shield is configured to block an air flow path between an area of discharge air from the engine cooling system and a condenser air inlet of the transport refrigeration unit.

In addition to one or more of the features described above, or as an alternative, in further embodiments the shield includes a first brush mounted to a surface of the truck and a second brush mounted to an adjacent surface of at least one of the trailer and the transport refrigeration unit.

In addition to one or more of the features described above, or as an alternative, in further embodiments the first brush and the second brush are substantially identical.

In addition to one or more of the features described above, or as an alternative, in further embodiments a portion of the first brush and the second brush is arranged in an overlapping configuration when the tractor cabin and trailer are in a linear configuration.

In addition to one or more of the features described above, or as an alternative, in further embodiments the first brush and the second brush are arranged at an angle to one another.

In addition to one or more of the features described above, or as an alternative, in further embodiments the first brush and the second brush are arranged substantially parallel to one another.

In addition to one or more of the features described above, or as an alternative, in further embodiments at least one of the first brush and the second brush includes a base and a plurality of bristles extending from the base.

In addition to one or more of the features described above, or as an alternative, in further embodiments a density of the bristles is sufficient to at least partially block a flow of air and debris there through.

In addition to one or more of the features described above, or as an alternative, in further embodiments the plurality of bristles extend from the base at varying angles such that a thickness adjacent a free end of the bristles is substantially greater than a thickness of the bristles at the base.

In addition to one or more of the features described above, or as an alternative, in further embodiments the plurality of bristles extend from the base in parallel such that the brush has a substantially uniform thickness.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
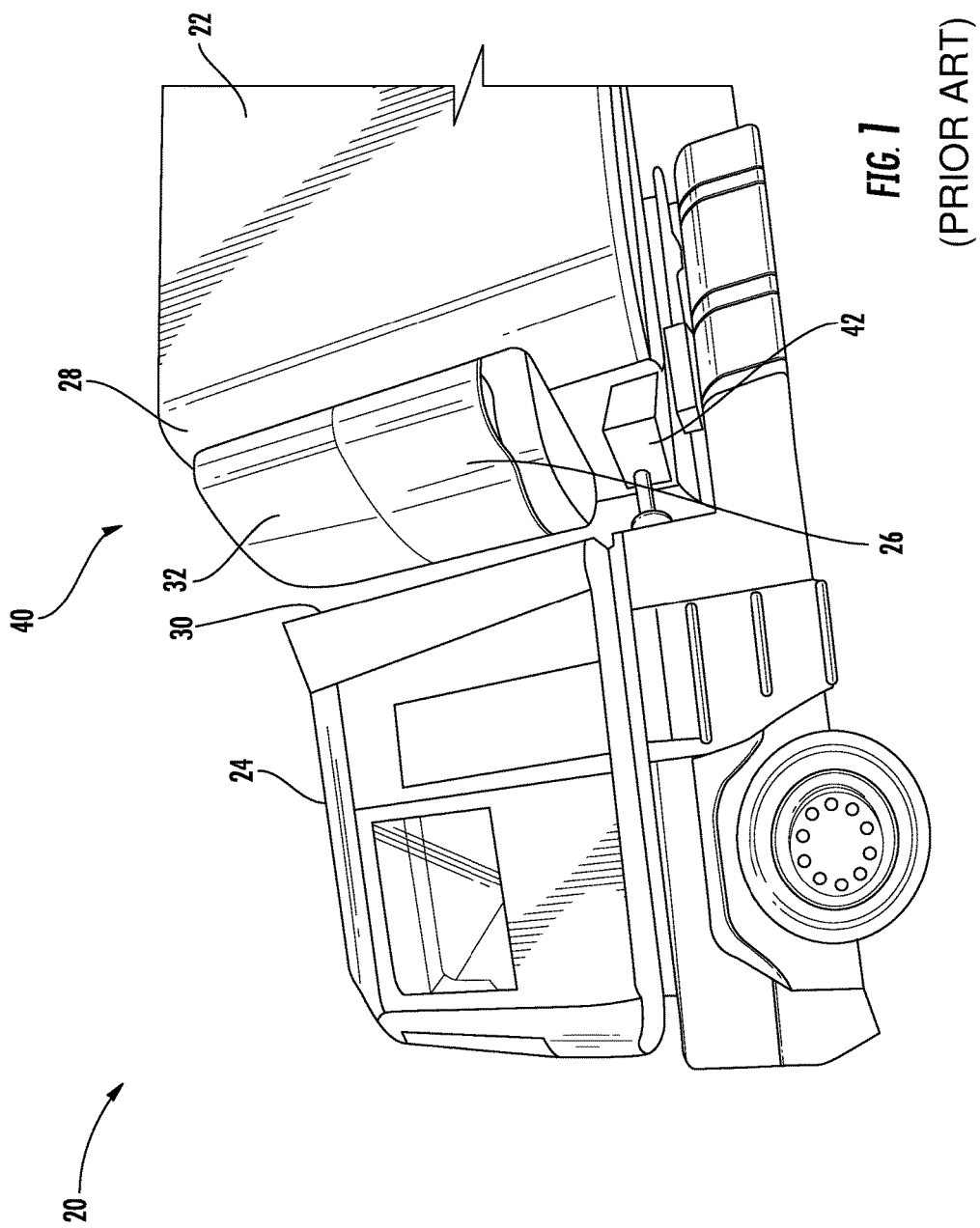
FIG. 1 is a perspective view of an example of a transport refrigeration system.

Referring now to FIG. 1, an example of a transport refrigeration system 20 is illustrated. In the illustrated, non-limiting embodiment, the transport refrigeration system 20 includes a trailer 22 towed or otherwise transported by a tractor 24 having a cabin. The system 20 includes a trailer refrigeration unit 40 enclosed within an outer cover 26 and attached to a surface 28 of the trailer 22 adjacent the back 30 of the tractor cabin 24. As is common for transport refrigeration systems 20, various panels or other portions of the outer cover 26 may be hinged and/or are removable to provide efficient access to the refrigeration unit 40 to perform routine maintenance.

The transport refrigeration unit 40 generally comprises a one-piece, self-contained refrigeration/heating unit including a compressor, a condenser, an evaporator, and an engine. In the illustrated, non-limiting embodiment, an air inlet for drawing in ambient air configured to cool the refrigerant and engine water as it flows through the condenser is provided by way of a grill 32 located at the upper portion of the cover 26.

Operation of the tractor 24, and therefore the engine (not shown), results in generation of an exhaust that must be expelled into the ambient atmosphere outside the tractor cabin 24. In truck-trailer systems, air from an engine cooling system of the tractor cabin 24 is blown between the tractor cabin 24 and the trailer 22 adjacent the bottom of the refrigeration unit 40. For clarity, this area is identified in FIGS. 1 and 2 as number 42.

Figure 2:
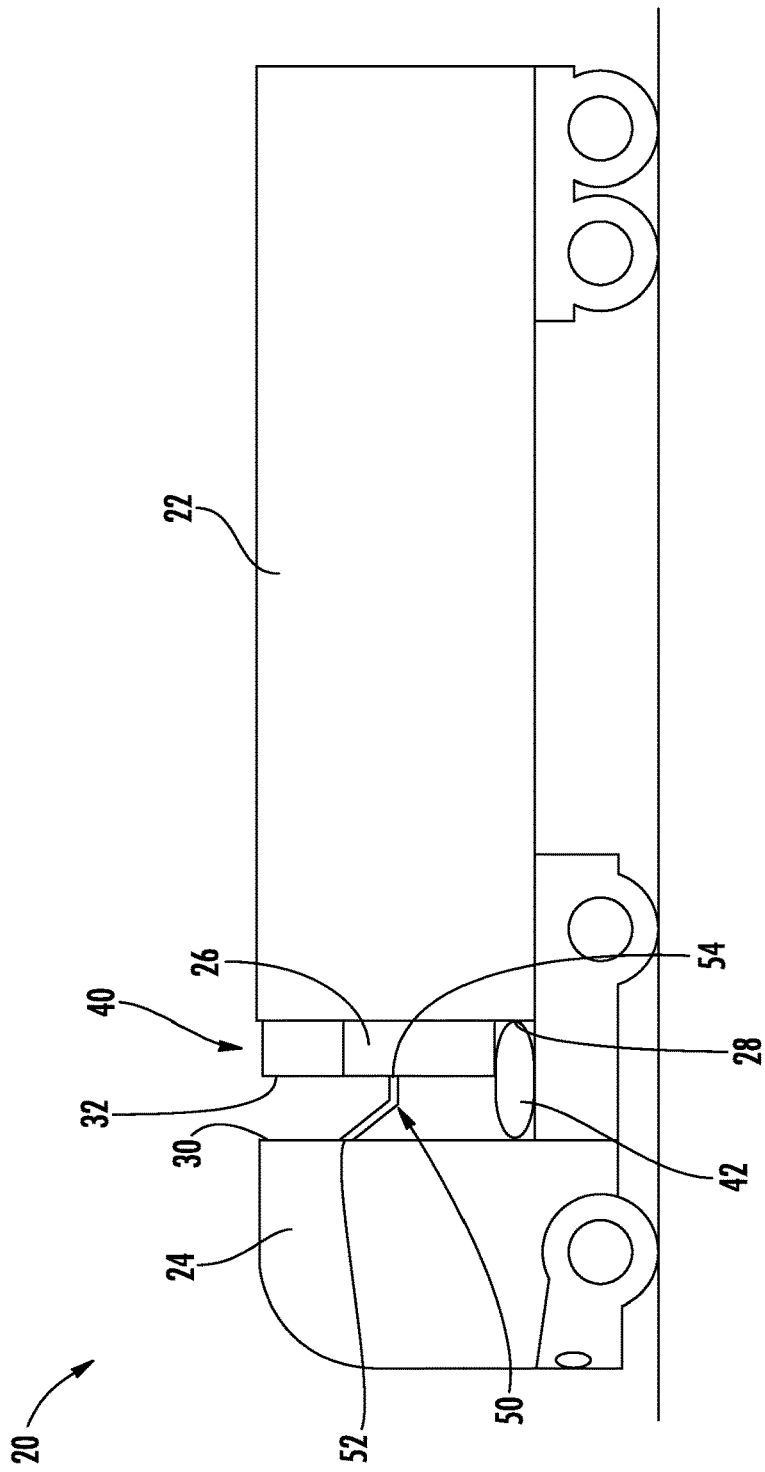
FIG. 2 is a side view of a transport refrigeration system according to an embodiment of the invention prior to a turning operation.

Referring now to FIG. 2, a shield 50 is positioned between the tractor cabin 24 and the trailer 22 according to an embodiment of the invention. In one embodiment, a first end 52 of the shield 50 may be coupled to the back surface 30 of the tractor cabin 24, and a second end 54 of the shield 50 may be connected to the front surface 26 of the trailer 22 or to a surface of the transport refrigeration unit 40. As shown, the shield 50 is generally arranged at some location between the area 42 and the grill 32 fluidly coupled to the condenser air inlet of the refrigeration unit 40 to block an air flow path defined there between. As a result, the shield 50 is configured to prevent the warm or hot exhaust air from flowing upwards and being drawn into the condenser air inlet, thereby improving the operational efficiency of the refrigeration unit 40.

Figure 3:
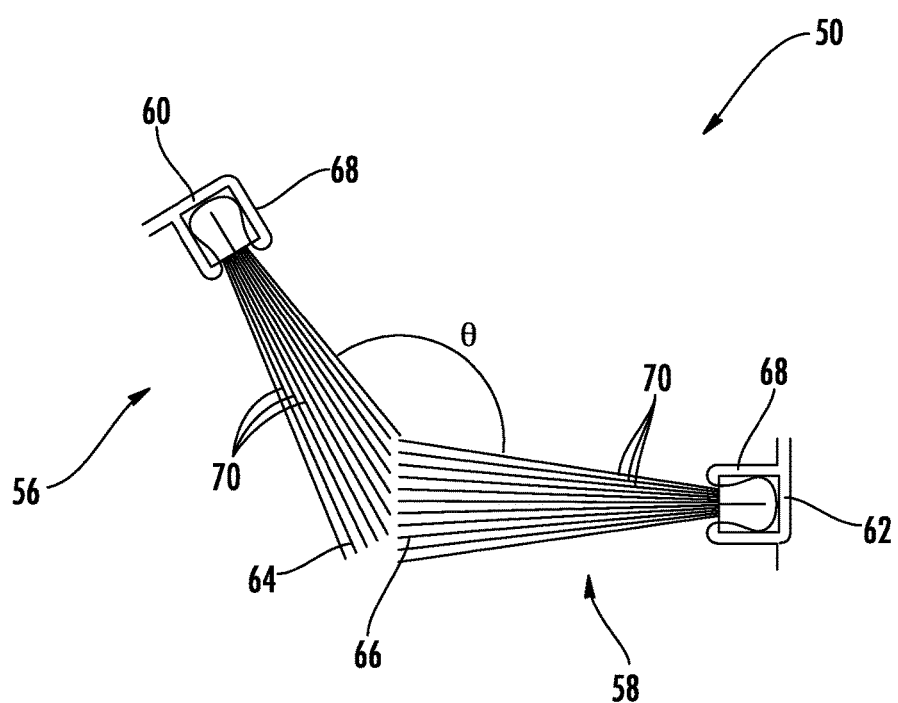
FIG. 3 is a detailed cross-sectional view of a heat shield configured for use with the transport refrigeration system according to an embodiment of the invention.

In the illustrated, non-limiting embodiment of FIG. 3, the shield 50 comprises at least two similar brushes 56, 58. A first end 60 of the first brush 56 is mounted to the back surface 30 of the tractor cabin 24, and a first end 62 of the second brush 58 is mounted to the front surface 26 of the refrigeration unit 40. Various methods for affixing the brushes 56, 58 to the tractor cabin 24 and refrigeration unit 40 are within the scope of the invention. The first brush 56 and second brush 58 extend across at least a portion of the width of the tractor cabin 24 and refrigeration unit 40, respectively. Each of the first and second brush 56, 58 may be a single brush, or alternatively, may include a plurality of substantially similar but distinct brushes aligned with one another across a width of the tractor cabin 24 or trailer 22.

The second ends 64, 66 of the first and second brush 56, 58 are positioned such that a portion of the first brush 56 and second brush 58, such as the second ends 64, 66 thereof for example, are arranged in an overlapping configuration when the tractor cabin 24 and trailer 22 are in a linear configuration. However, when the transport refrigeration system 20 deviates from a linear position, such as when the tractor cabin 24 makes a turn for example, the first and second brush 56, 58 may, or only a portion thereof may, but need not remain overlapped with one another. In one embodiment, the first brush 56 and the second brush 58 are located at an angle θ to one another, such as between about 90 degrees and about 180 degrees for example. In other embodiments, the first brush 56 and the second brush 58 may be arranged substantially parallel to one another.

As shown in FIG. 3, each of the first brush 56 and the second brush 58 may include a base 68 mounted to the tractor cabin 24 and refrigeration unit 40, respectively, and a plurality of bristles 70 extending outwardly in a first direction from the base 68. The configuration of the bristles 70 of the first brush 56 and the second brush 58 may be similar, or alternatively, may be different. In one embodiment, illustrated in FIG. 3, the plurality of bristles 70 are configured to extend from the base 68 at varying angles such that a thickness of the second end 64, 66 of the brush 56, 58 as defined by the bristles 70 is substantially greater than a thickness at the first end 60, 62 of the brush 56, 58. Alternatively, the plurality of bristles 70 may be mounted in a parallel configuration such that the thickness of the brush as defined by the bristles 70 remains substantially constant between the first end 60, 62 and the second end 64, 66 of the brush. The brushes 56, 58, and in particular the bristles 70, may be formed from any flexible, durable material, for example plastic, polyamide, or any other suitable material. The density of the bristles 70 within each brush 56, 58 is sufficient to at least partially block a flow of air or other fluids of gasses there through. Although the shield 50 illustrated and described herein includes at least two brushes 56, 58, other types of shields 50, such as a unibody shield formed from a flexible material are within the scope of the invention.

Inclusion of a heat shield 50 between the tractor cabin 24 and the trailer 22 as described herein will limit the circulation of hot air from the engine cooling system of the tractor cabin 24 and dust towards the grill 32 of the condenser air inlet. As a result, more ambient air will be drawn into the condenser, thereby improving not only the efficiency, and therefore the fuel consumption of the system 20, but also the reliability thereof.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A transportation refrigeration system, comprising:
 a tractor cabin having an engine and an engine cooling system;
 a trailer operably coupled to the tractor cabin;
 a transport refrigeration unit configured to maintain a controlled temperature environment of a portion of the trailer, the transport refrigeration unit being mounted to a front surface of the trailer adjacent the truck; and
 a shield mounted to at least one of the tractor cabin, trailer, and transport refrigeration unit within an opening defined between the tractor cabin and one of the trailer and the transport refrigeration unit, the shield being configured to block an air flow path between an area of discharge air from the engine cooling system and a condenser air inlet of the transport refrigeration unit, wherein the shield includes a first brush mounted to a surface of the truck, and a second brush mounted to an adjacent surface of at least one of the trailer and the transport refrigeration unit.

2. The system according to claim 1, wherein the first brush and the second brush are substantially identical.

3. The system according to claim 1, wherein a portion of the first brush and the second brush is arranged in an overlapping configuration when the tractor cabin and trailer are in a linear configuration.

4. The system according to claim 1, wherein the first brush and the second brush are arranged at an angle to one another.

5. The system according to claim 1, wherein the first brush and the second brush are arranged substantially parallel to one another.

6. The system according to claim 1, wherein at least one of the first brush and the second brush includes a base and a plurality of bristles extending from the base.

7. The system according to claim 6, wherein a density of the bristles is sufficient to at least partially block a flow of air and debris there through.

8. The system according to claim 6, wherein the plurality of bristles extend from the base at varying angles such that a thickness adjacent a free end of the bristles is substantially greater than a thickness of the bristles at the base.

9. The system according to claim 6, wherein the plurality of bristles extend from the base in parallel such that the brush has a substantially uniform thickness.

\* \* \* \* \*